United States Patent [19]

Ekeborg et al.

[11] 4,161,322
[45] Jul. 17, 1979

[54] VEHICLES HAVING REDUCED TILTING OF THE SUPERSTRUCTURE THEREOF RELATIVE TO THE WHEEL AXLE SUPPORT THEREFOR

[75] Inventors: Bo-Gunnar Ekeborg; Stig-Gunnar Lofgren, both of Jarved, Sweden

[73] Assignee: Mo och Domsjo Aktiebolag, Ornskoldsvik, Sweden

[21] Appl. No.: 844,091

[22] Filed: Oct. 17, 1977

[30] Foreign Application Priority Data

Oct. 22, 1976 [SE] Sweden .................................. 7611772

[51] Int. Cl.$^2$ ............................................. B62D 37/00
[52] U.S. Cl. ................................... 280/6 R; 280/6.11; 280/DIG. 1; 296/190
[58] Field of Search ....................... 280/6 R, 6.1, 6.11, 280/DIG. 1; 296/28 C

[56] References Cited

U.S. PATENT DOCUMENTS

| | | | |
|---|---|---|---|
| 2,293,328 | 8/1942 | Coburn | 280/6 R |
| 3,341,216 | 9/1967 | Bradford | 280/6.11 |

*Primary Examiner*—Philip Goodman

[57] ABSTRACT

Multiaxle vehicles are provided having a superstructure that tilts less than the wheel axle support therefor, comprising a chassis; at least first and second wheel axles supporting the chassis, at least one of which is pivotably mounted on the chassis so as to be tiltable sideways about the pivot mounting in a plane substantially parallel to the sideways tilting plane of the vehicle; a superstructure pivotably mounted on the chassis above the pivot mounting for the tiltable axle, for tilting about the pivot mounting in a plane parallel to the axle tilting plane; and means on one side of the pivot mounting for the tiltable axle, linking the superstructure of the tiltable axle, and pivotably attached to the superstructure on one side of the chassis and to the tiltable axle on the other side of the chassis, the spacing between the pivot mounting of the axle and the pivot attachment of the linking means thereto being less than the spacing between the pivot mounting of the superstructure and the pivot attachment of the linking means thereto, to tilt the superstructure about its pivot mounting less than the tiltable axle when the tiltable wheel axle is tilted sideways.

12 Claims, 11 Drawing Figures

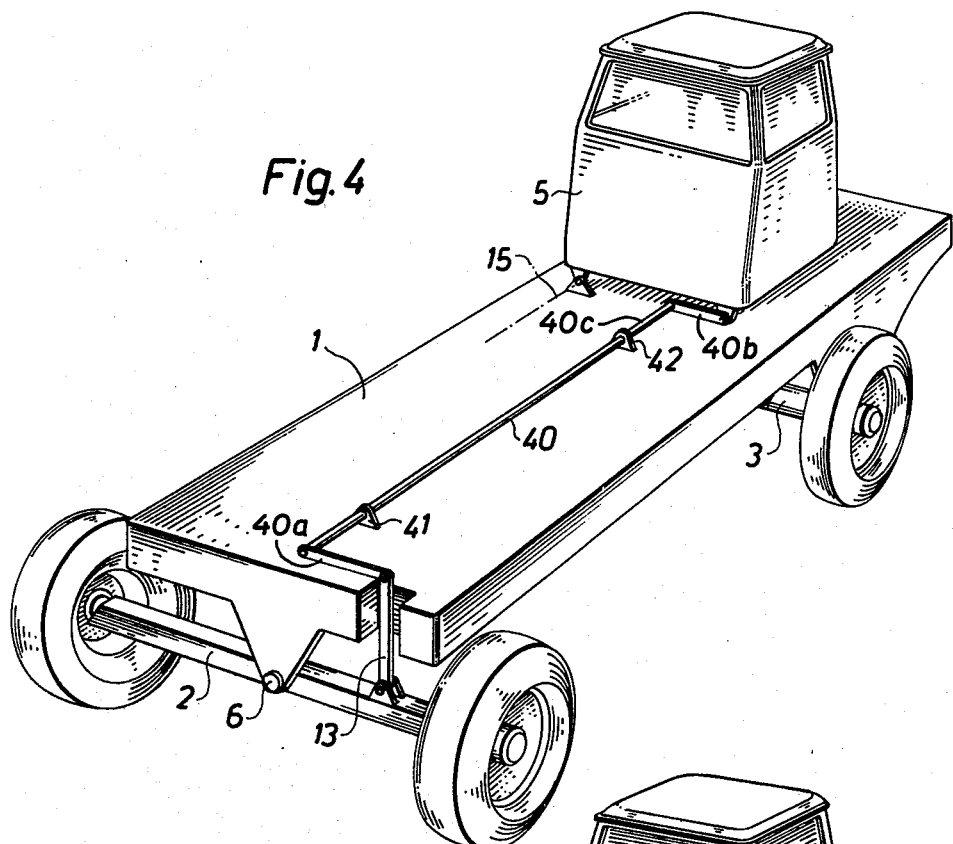
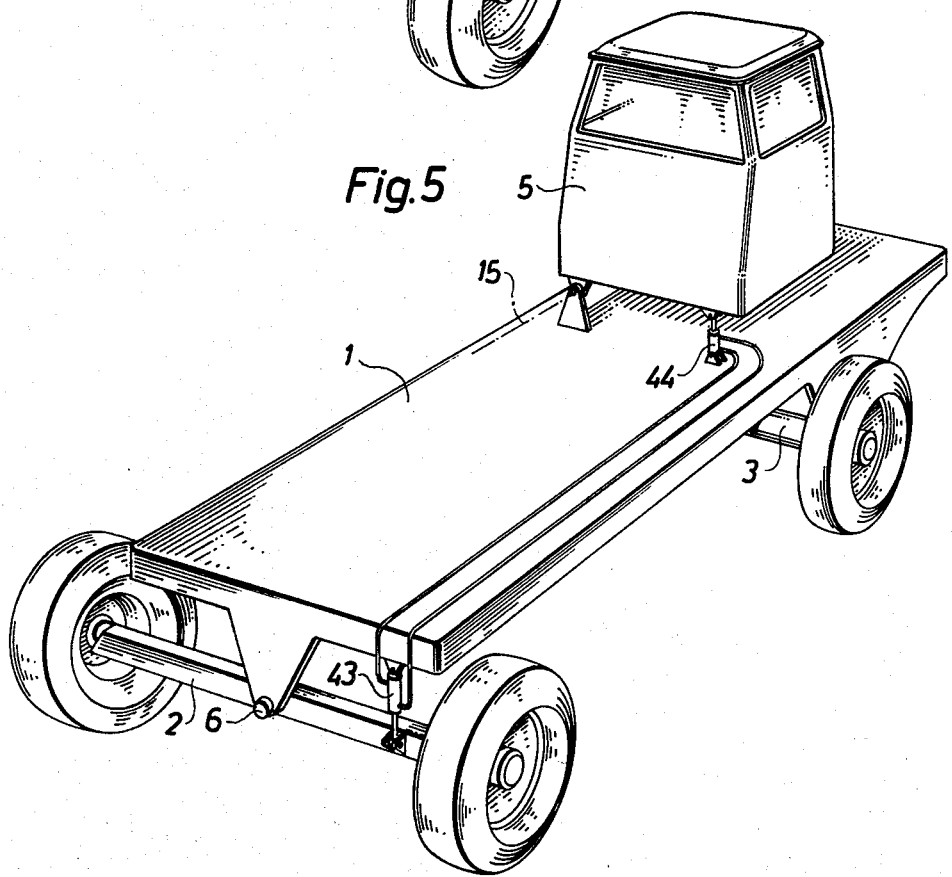

U.S. Patent Jul. 17, 1979 Sheet 4 of 5 4,161,322
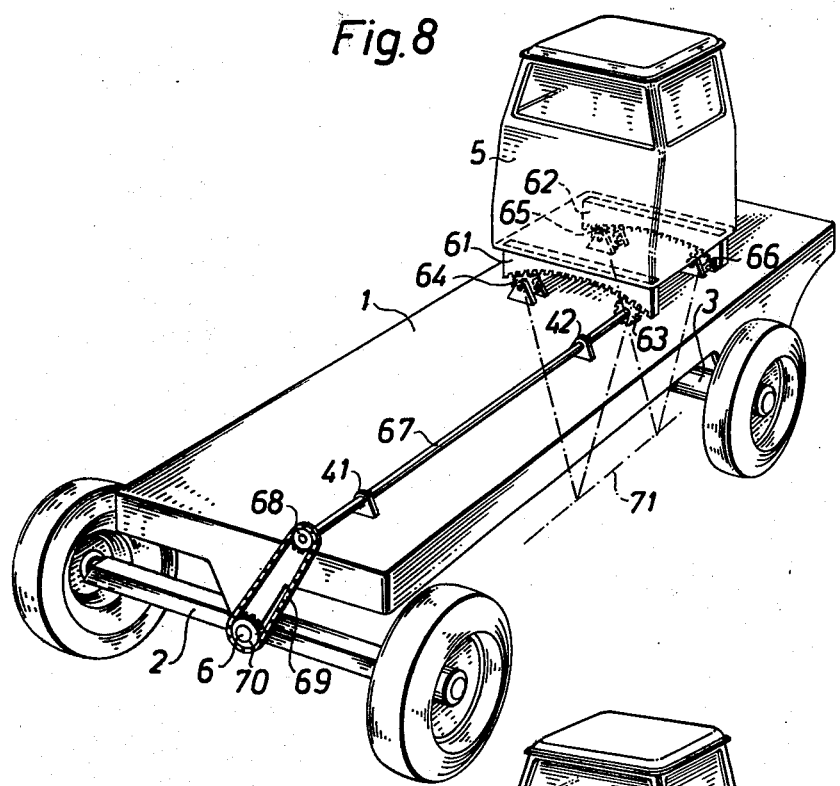
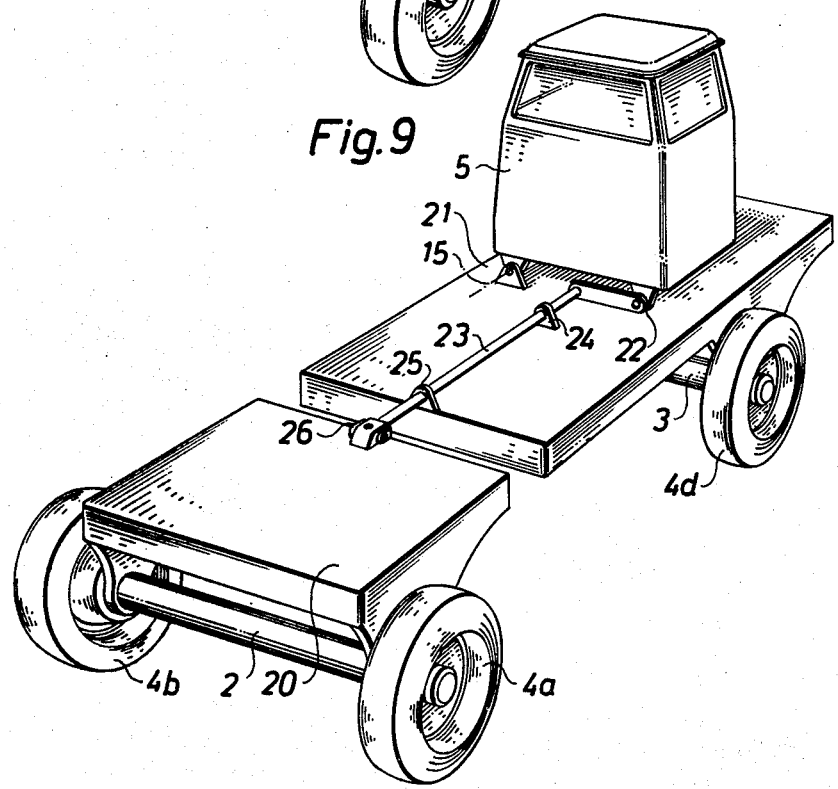

VEHICLES HAVING REDUCED TILTING OF THE SUPERSTRUCTURE THEREOF RELATIVE TO THE WHEEL AXLE SUPPORT THEREFOR

The tilting and lurching of land rover vehicles during travel over rough terrain can be a great inconvenience, and very tiring for the vehicle driver. This is a particular problem using mobile logging and reforestation machinery, the driving of which requires the prolonged, uninterrupted and sharp attention of the driver.

In order to counteract lateral oscillation of such vehicles, it has been proposed in British Pat. Specification No. 1,189,705 that at least one of the wheel axles oscillate about an axis parallel to the length of the vehicle, with one or more hydraulic cylinders placed between the wheel axle and vehicle chassis. The hydraulic cylinders dampen sideways tilting of the vehicle chassis automatically whenever the angle of tilt between the vehicle chassis and a reference plumb line exceeds a predetermined minimum. However, these devices are complicated, as a result of being automatic, and therefore prone to develop operational difficulties.

The vehicle chassis and/or the cab can be spring-mounted on the wheel axles, but springs are capable of damping only minor twisting and vibrations. The large twisting movements are still transmitted to the cab and cause tilting the cab transversely of the vehicle.

The driver's seat can be mounted in the cab in a manner to tilt when the vehicle tilts, but less. However, this is not so practical, since it requires that the driving controls tilt too.

The present invention avoids these difficulties and yet lessens the sideways tilt of the superstructure on a vehicle, such as a driver's cab, work platform, or cargo carrier, in travel over uneven terrain. The invention provides a vehicle having a chassis; at least first and second wheel axles supporting the chassis, at least one of which is pivotably mounted on the chassis so as to be tiltable sideways about the pivot mounting in a plane substantially parallel to the sideways tilting plane of the vehicle; a superstructure pivotably mounted on the chassis above the pivot mounting for the tilting axle, for tilting about its pivot mounting in a plane parallel to the axle tilting plane; and means on the other side of the pivot mounting for the tiltable axle, linking the superstructure to the tiltable axle, and pivotably attached to the superstructure on one side of the chassis and to the tiltable axle on the other side of the chassis, the spacing between the pivot mounting of the axle and the pivot attachment of the linking means thereto being less than the spacing between the pivot mounting of the superstructure and pivot attachment of the linking means thereto, to tilt the superstructure about its pivot mounting when the tiltable wheel axle is tilted sideways.

The drawings shown preferred embodiments of the invention, in which:

FIG. 4 shows a second embodiment of vehicle with the driver's cab pivotably mounted intermediate the end of the vehicle chassis, and linked to the forward tilting wheel axle by a crankshaft;

FIG. 5 shows a third embodiment of vehicle, with the driver's cab mounted on the chassis as in FIG. 4, and hydraulically linked to the tilting wheel axle.

FIG. 8 shows a sixth embodiment of vehicle similar to FIG. 7 but with a rack and pinion linkage system;

FIG. 9 shows a seventh embodiment of vehicle with the driver's cab pivotably mounted on the second of two coupled wheeled vehicle chassis parts;

The vehicles shown in the Figures can be driven in either direction. The front end of each vehicle has been shown in a head-on view.

Figure 1:
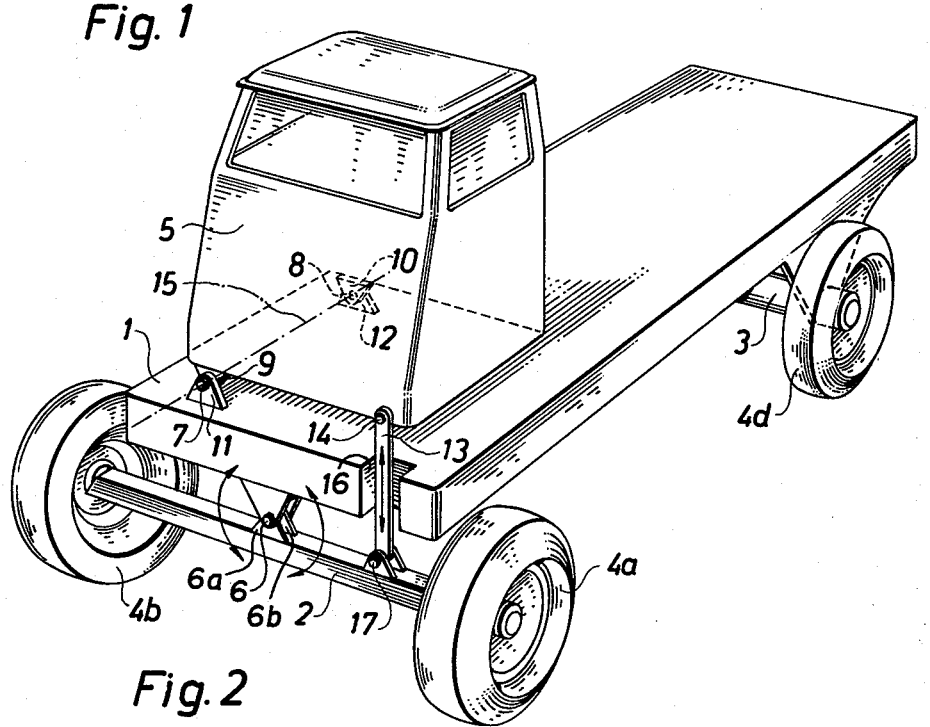
FIG. 1 shows one embodiment of vehicle with a driver's cab pivotably mounted on one end of the vehicle chassis, and linked to the forward tilting axle.

The vehicle shown in FIG. 1 has a vehicle chassis 1, supported on front and rear wheel axles 2, 3 with wheels 4a, 4b, 4d, with a driver's cab 5 mounted on the vehicle chassis. The front wheel axle 2 is tiltably mounted below the vehicle chassis on a pivot pin 6 rotatable in the bracket supports 6a, 6b as shown by the arrows along the longitudinal axis of the vehicle. The rear wheel axle 3 is rotatably but nontiltably mounted below the vehicle chassis, and cannot tilt in relation thereto.

Two brackets 9, 10 carrying pivot pins 7, 8 are attached to the underside of the cab 5. The pins are rotatable in two bearing blocks 11, 12, fixedly mounted on the vehicle chassis, and together they form a tilting axis 15 for the cab along the longitudinal axis of the vehicle. A connecting rod 13 is pivotably mounted at its upper end on the cab at 14, and extends therefrom through a recess 16 in the chassis to the tilting front wheel axle 2, on which it is pivotably mounted at 17 at its lower end. When the vehicle is driven over rough ground, the relative tilting movements of the front wheel axle 2 and the rear wheel axle 3 are transmitted to the cab by the rod 13. The cab is thereby tilted on the axis 15 in the same direction as the front wheel axle 2 tilts in relation to the rear wheel axle 3. However, because pivot pins 7, 8, are on one side of pivot pin 6, and the connecting rod 13 is on the other side, the total tilting of the cab is considerably less than that of the axle 2.

This is illustrated with the following four Examples, in which for simplicity only one of the vehicle wheels rolls over an obstacle on the ground and is raised, while the remaining wheels remain at ground level. The wheel axles 2 and 3 are equal in length, and the right front wheel 4b, the pivot axis 15, the pin 6, rod 13 and the left front wheel 4a are substantially the same distance apart with the vehicle horizontal. However, these variables can be modified as practical requirements demand. For example, by increasing the distance between the rod 13 and the pin 6 in relation to the distance between the pin 6 and the axis 15, the cab tilting will be less when one of the rear wheels rolls over an obstacle, but greater when one of the front wheels rolls over an obstacle. If instead the distance between the rod 13 and the pin 6 is decreased, the opposite result will be obtained.

Example I

Figure 2:
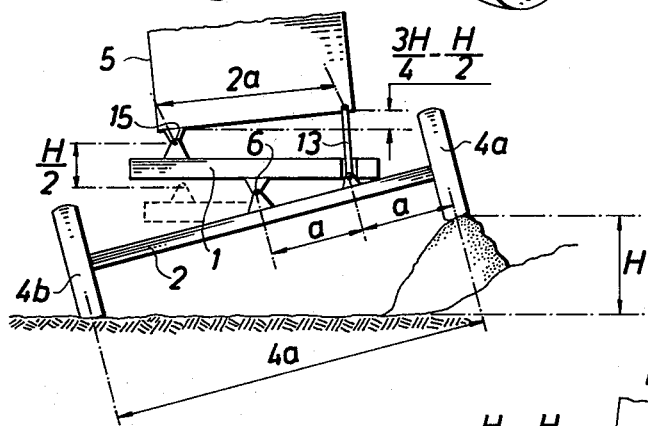
FIGS. 2 and 3 show the vehicle according to FIG. 1 tilted in each of the sideways directions.

The left front wheel 4a of the vehicle of FIG. 2 rolls over a stone of height H above ground surface. The lifting of the front wheel is transmitted partly via the rod 13 to the left side of the cab, which is raised 3H/4, and partly via the pin 6 and axis 15 to the right side of the cab, which is raised as much as the pin 6, i.e., H/2. As a result the tilting of the cab in relation to the horizontal vehicle chassis 1 is:

$$\frac{\frac{3H}{4} - \frac{H}{2}}{2a} = \frac{H}{8a}$$

which is only half the tilt acquired by the front wheel axle (=H/4a.

Example II

Figure 3:
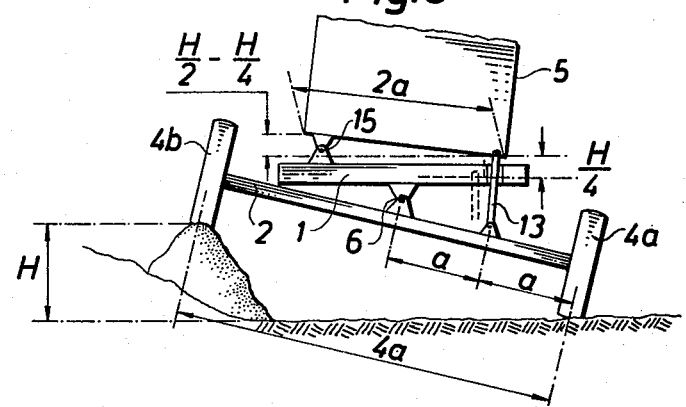

The right front wheel 4b of the vehicle of FIG. 3 rolls over a stone of height H above ground surface. The lifting of the front wheel is transmitted partly via the rod 13 to the left side of the cab, which is raised H/4, and partly via the pin 6 and axis 15 to the right side of the cab, which is raised H/2. As a result, the tilting of the cab in relation to the horizontal vehicle chassis 1 is:

$$\frac{\frac{H}{2} - \frac{H}{4}}{2a} = \frac{H}{8a}$$

which is half the tilting given to the front wheel axle (=H/4a).

Examples III and IV

When the right and left rear wheels 4c, 4d of the vehicle roll over the stone, the relative tilting of the wheel axles will be the same as in Examples I and II above, as well as the tilting angle of the cab to the horizontal.

FIGS. 4 to 11 illustrate further embodiments of the apparatus of the invention. In these Figures, like reference numerals refer to like parts in FIGS. 1 to 3.

In FIG. 4 the connecting rod 13 is linked to the cab 5 by a crankshaft 40, with two cranks 40a, 40b pointing in the same direction. The crankshaft is pivotably mounted in the bearings 41, 42 about an axis parallel to the longitudinal axis of the vehicle. With this arrangement the cab can be mounted well back on the vehicle at the rear end 40c of the crankshaft 40.

As shown in FIG. 5, the connecting rod 13 and the crankshaft 40 can be replaced with a hydraulic system. The vehicle shown in FIG. 5 is provided with two hydraulic cylinders 43, 44. Cylinder 43 is pivotably connected between the pivotably mounted wheel axle 2 and the vehicle chassis 1. Cylinder 44 is pivotably connected between the chassis 1 and cab 5. The cylinders are hydraulically coupled to each other, so that they move in unison. In this embodiment, the apparatus can easily be provided with means for operating the hydraulic cylinders, so that the swing of the cab is automatically limited or arrested.

Figure 6:
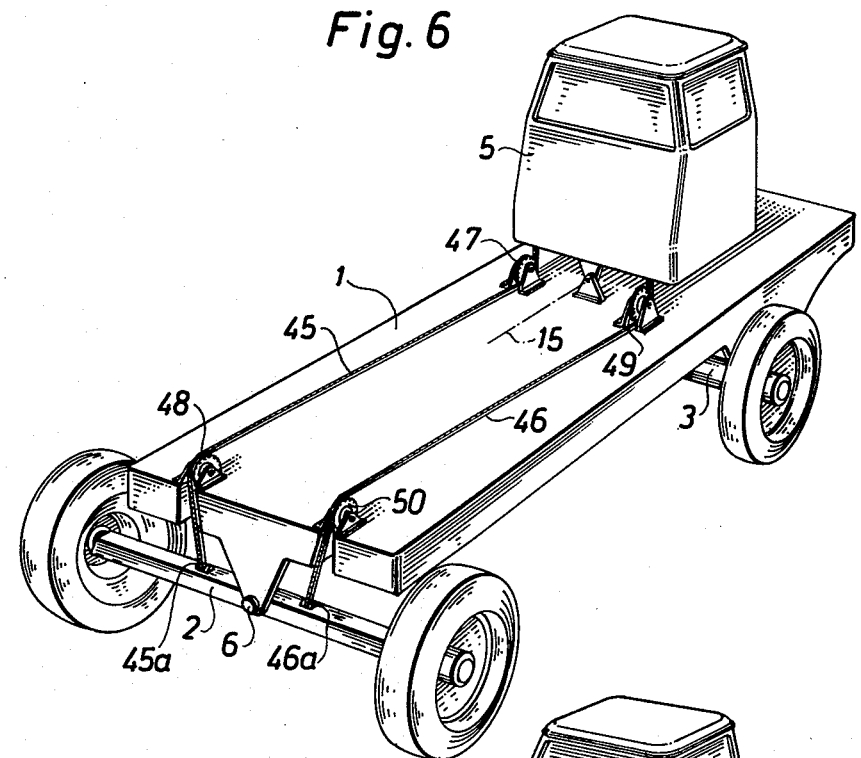
FIG. 6 shows a fourth embodiment of vehicle with the driver's cab arranged as in FIG. 4 and linked to the tilting wheel axle by a chain.

As shown in FIG. 6, the connecting rod 13 and crankshaft 40 can aslo be replaced with a flexible linkage such as two chains 45, 46, which are connected at one end 45a, 46a to the pivotably mounted wheel axle 2 on each side of its pivot 6, over four idler wheels 47, 48, 49, 50 backwards to the adjacent lower edge of the cab 5 on each side of the pivot axis 15. The design enables the chains and idlers to be enclosed, and, if so required, arranged on the underside of the vehicle chassis 1. It is however possible to arrange the cab on the forward part of the chassis (as has been done in the embodiment according to FIGS. 1 to 3) and connect the chains substantially vertically directly between the cab and the wheel axle 2, without using idlers. Instead of chains, it is also possible to use cables, ropes or other similar flexible linkages.

Figure 7:
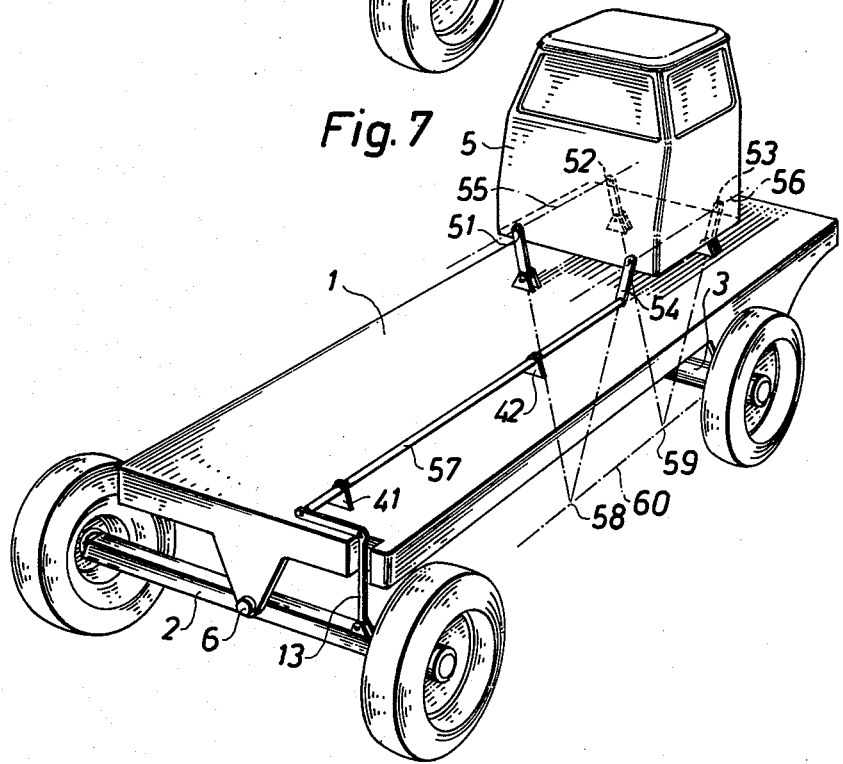
FIG. 7 shows a fifth embodiment of vehicle with the driver's cab pivotably mounted on the chassis as in FIG. 4 about an axis beneath the chassis, and connected to the tilting wheel axle with a linkage system.

FIG. 7 shows a vehicle provided with four connecting rods 51, 52, 53, 54 of equal length carrying the cab 5. The rods 51, 52, 53, 54 are pivotably mounted on pivot pins in the lower part of the cab, the pivot pins forming two pivot axes 55, 56 parallel to the longitudinal axis of the vehicle. At their lower ends the rods 51, 52 and 53 are pivotable on pivot pins 51a, 52a, 53a, 54a in brackets 51b, 52b, 53b mounted on the vehicle chassis 1, while the rod 54 is pivotable with L-shaped shaft 57 (to which it is rigidly fixed), which is pivotably mounted in bearings 41, 42 on the vehicle chassis. The front or arm portion of the shaft 57 is pivotably attached to the connecting rod 13. The rods 51, 52, 53, 54 extend downwardly, converging in pairs. The angles of inclination of the converging rods are so selected that the extensions of the two pairs of rods would intersect at two points 58, 59, between which there is thus formed an imaginary pivot axis 60 for the cab.

When the wheel axle 2 is tilted about the pin 6, the cab is turned in the same direction, with a restricted rotation about the imaginary axis 60. The latter is simultaneously displaced somewhat along an arcuate path directed upwardly, and counter to the direction in which the vehicle tilts, so that the cab is both tilted and laterally displaced somewhat, in the tilting direction.

In the embodiment shown in FIG. 8, the cab 5 is provided with two arcuate concave rack gears 61, 62. The rack gears are spaced from each other, and rigidly attached to the underside of the cab across the vehicle and with their teeth downwards. Each rack gear is meshed with two pinion gears 63, 64 and 65, 66, respectively, which carry the cab along the rack gears. One of the pinions 63 is rigidly attached to the rear end of a shaft 67, pivotable in bearings 41, 42, while the remaining pinions 64, 65, 66 are rotatably mounted on the vehicle chassis 1.

At its forward end the shaft 67 is provided with a rigidly attached sprocket 68, which is movable in unison via a chain 69 with a sprocket wheel 70, fixed to the pivotable wheel axle 2 and concentric with its pivot axis. The tilting movement of the wheel axle 2 about the pin 6 are transmitted to the cab via the sprocket wheels 70 and 68, chain 69, shaft 67 and pinion 63. The cab is thus tilted with limited freedom about an imaginary axis 71 situated under the vehicle chassis, and formed by a line through the center of the radius of curvature of the pitch line for the two racks.

By altering the gear ratio of the sprockets 68 and 70, the amount of tilt transmitted to the cab can be varied in a simple way.

It is also possible to substitute an L-shaped shaft and a connecting rod coupled between it and the wheel axle 2 as in the vehicle of FIG. 7 instead of the chain 69 and sprocket wheels 68, 70, and to replace the L-shaped shaft 57 and the link 13 in the vehicle of FIG. 7 with a chain and sprocket wheel.

In the embodiment shown in FIG. 9, the vehicle chassis is in two chassis parts 20, 21, coupled together and provided with wheel axles 2 and 3, respectively. On the rear chassis portion 21 the cabin is pivotably mounted at 15 and pivotably connected at 22 to a crankshaft 23. The crankshaft is pivotably mounted on the rear chassis portion at brackets 24, 25, and extends longitudinally of the vehicle to the forward chassis portion 20, to which it is pivotably attached by the universal joint 26. The spacing of the different pivot points can be adjusted to meet different needs. If, for example, the spacing between the pivot center for the crankshaft 23 and the pivot point 22 is increased, the amount of swing in the cab will be less when one of the vehicle wheels on the rear chassis portion 21 goes over an obstacle, but greater when one of the wheels on the forward chassis portion 20 goes over the same obstacle. In this embodiment, with a vehicle chassis in two parts, the forward chassis part 20 and its wheel axle 2 can be considered to form a unit corresponding to the wheel axle 2 of the vehicle in the embodiments according to FIGS. 1 to 8.

Figure 10:
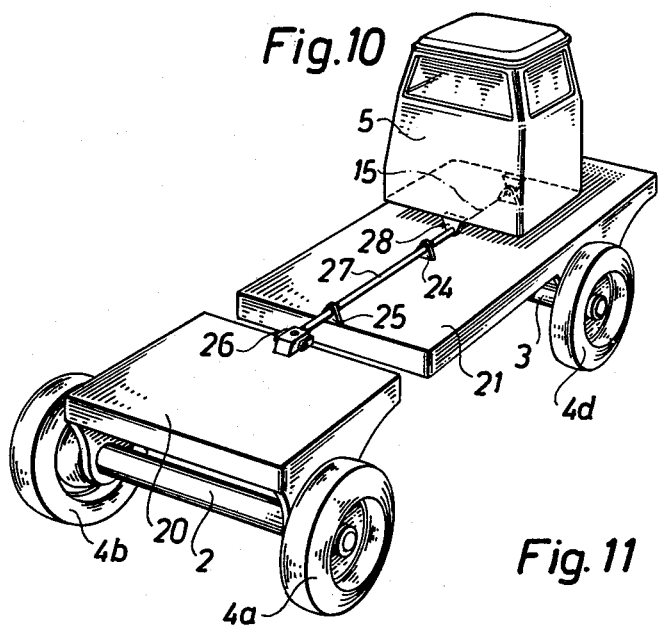
FIG. 10 shows an eighth embodiment of vehicle with the driver's cab pivotably mounted on the second of two coupled wheeled vehicle chassis parts.

In the vehicle of FIG. 10, the vehicle chassis is in two chassis parts 20, 21, connected together and provided with wheel axles 2, 3. The pivot axis 15 of the cab 5 is in this case arranged on the rear chassis part 21, so that is coincides with the extended axis of the shaft 27 mounted at brackets 24, 25 on the rear chassis part. The shaft 27 in turn is pivotably connected to the forward chassis part 20 at the universal joint 26. At its opposite end the shaft 27 is fixedly mounted to the cab at 28. This is a very simple and especially well-adapted structure.

In the type of vehicle shown in FIG. 10, a large lateral displacement of the cab can result if the vehicle is provided with conventional chassis steering, and a fixedly mounted cab on the rear chassis part. When such a vehicle passes over an obstacle with one of the rear wheels, the cab will be displaced sideways at a high tilting angle. In the vehicle of FIG. 10, however, the tilting of the rear frame portion 21 will pivot the bearings 24 and 25 around the shaft 27, connected between the cab and the forward chassis part 20, and the cab will retain an unaltered level position, and be laterally displaced only according to the height of the cab from the ground.

If one of the front wheels of the vehicle passes over an obstacle, the cab will be laterally displaced according to the tilting transmitted to it via the shaft 27. No further lateral displacement of the cab will take place, since the rear chassis part 21 and thereby the pivoting axis 15 of the cab is not affected by the tilting movement of the forward chassis part 20.

Figure 11:
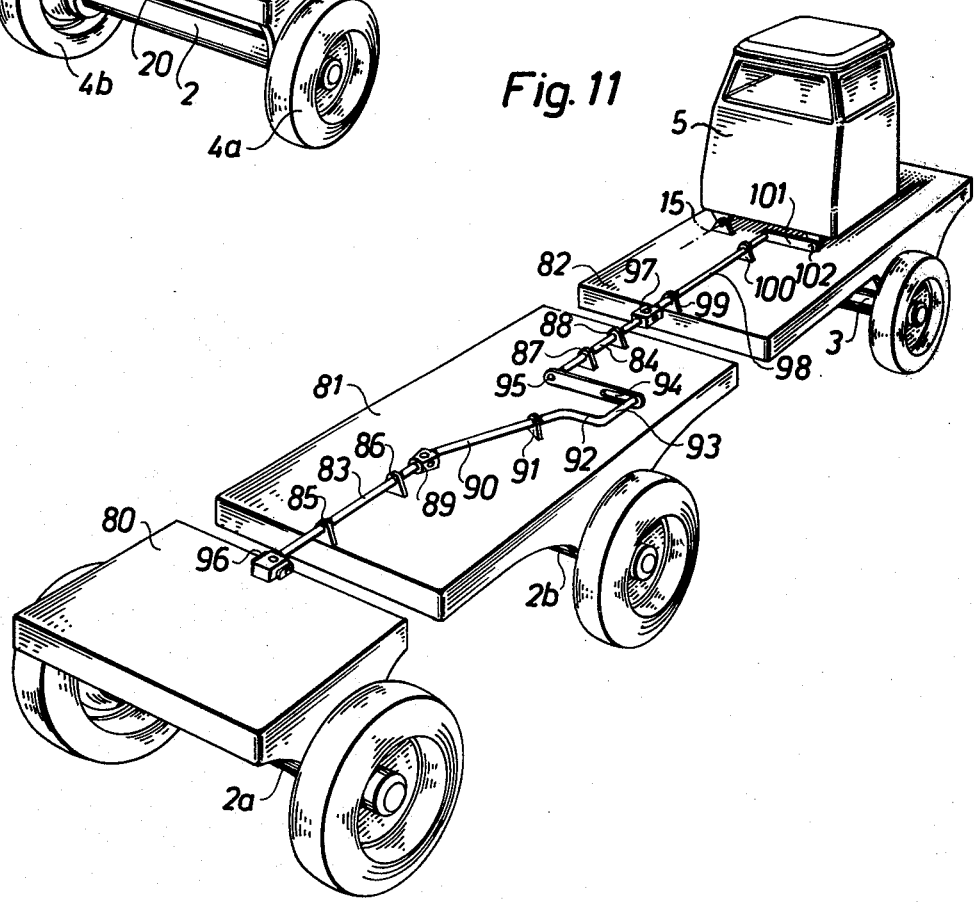
FIG. 11 shows a ninth embodiment of vehicle with the driver's cab pivotably mounted on the third of three wheeled vehicle chassis parts coupled together.

In the vehicle shown in FIG. 11, the vehicle chassis is in three chassis parts 80, 81, 82, coupled one behind the other and provided with wheel axles 2a, 2b and 3, respectively. On the middle chassis part 81 there are two shafts 83 and 84 pivotably mounted on bearings in brackets 85, 86, 87 and 88, respectively, the pivot axes of which coincide with a vertical plane through the longitudinal axis of the chassis part 81. The forward shaft 83 is connected to an intermediate shaft 90 by the universal joint 89. The shaft 90 is pivotably mounted on bracket 91, and extends at an angle backwards towards the left side of the chassis part 81. A shaft 92 bent to an L-shape is attached to the shaft 90, so that one leg 93 extends backwards. The leg 93 fits into an elongate slot 94 in a link 95 attached to the rear axle 84 and at right angles thereto.

To connect the chassis parts 80, 81, 82 to each other, there are two universal joints 96, 97 respectively, fastened between the shaft 83 and the forward chassis part 80, and the shaft 84 and a shaft 98 on the rear chassis part 82. The shaft 98 is pivotably mounted on the rear chassis part at brackets 99, 100, and coincides with a vertical plane through the center axis of the chassis part, and at its rear end it is connected by means of a crank 101 to the cab 5 at bracket 102, while the cab in turn is pivotably mounted at 15 for sideways movement of the chassis part 82.

The vehicle displays a lessened cab tilt with tilting of the chassis parts. If, for example, the pivot points 15 and 102 on the cabin are spaced 90 cm apart, the links 95 and 101 are each 60 cm long, and the transverse portion of the link 92 is 40 cm long, each tilting movement of any of the chassis parts is reduced by one-third at the cab.

The cab in all the embodiments described above can be mounted on springs carried by a plate which is pivotably mounted on the vehicle chassis and connected to the forward wheel axles or chassis parts.

The mountings for the cab and/or one or more of the connecting rods or other elements between the cab and the pivotably mounted wheel axles can also be resilient, for a gentler tilting movement. Conventional springs and other shock-absorbing elements between the vehicle chassis parts and wheel axles can also damp or soften the movement.

The wheel axles are provided with single wheels, in the embodiments shown in the Figures, but multiwheel axles can also be used.

Having regard to the foregoing disclosure, the following is claimed as the inventive and patentable embodiments thereof:

1. A vehicle having a superstructure characterized by a low sideways tilt relative to a tilting axle, comprising, in combination, a chassis; at least first and second wheel axles supporting the chassis, at least one of which is pivotably mounted on the chassis so as to be tiltable sideways about the pivot mounting in a plane substantially parallel to the sideways tilting plane of the vehicle; a superstructure pivotably mounted on the chassis for tilting about its pivot mounting in a plane parallel to the axle tilting plane; and means on the other side of the pivot mounting for the tiltable axle, linking the superstructure to the tiltable axle, and pivotably attached to the superstructure on one side of the chassis and to the tiltable axle on the other side of the chassis, the spacing between the pivot mounting of the axle and the pivot attachment of the linking means thereto being less than the spacing between the pivot mounting of the superstructure and the pivot attachment of the linking means thereto, to tilt the superstructure less about its pivot mounting when the tiltable wheel axle is tilted sideways.

2. A vehicle according to claim 1, in which the means linking the superstructure to the tiltable axle is a connecting rod.

3. A vehicle according to claim 1, in which the means linking the superstructure to the tiltable axle is a piston reciprocable in a hydraulic cylinder.

4. A vehicle according to claim 1 in which the means linking the superstructure to the tiltable axle is a chain.

5. A vehicle according to claim 1, in which the means linking the superstructure to the tiltable axle is a crankshaft, pivotably mounted on the chassis, and having two cranks extending in a plane parallel to the tilting plane of the vehicle.

6. A vehicle according to claim 1, in which the means linking the superstructure to the tiltable axle is a rack and pinion gear.

7. A vehicle according to claim 1, in which the means linking the superstructure to the tiltable axle is a pair of hydraulically coupled hydraulic cylinders pivotably mounted on the chassis one on each side of the pivot mounting for the superstructure.

8. A vehicle according to claim 1, in which the means linking the superstructure to the tiltable axle is a pair of flexible members mounted on the superstructure on each side of the pivot mounting thereof.

9. A vehicle according to claim 1 in which the pivot mounting of the superstructure is above the chassis.

10. A vehicle according to claim 1 in which the pivot mounting of the superstructure is below the chassis.

11. A vehicle according to claim 1 having a chassis in first and second chassis parts and a coupling coupling the parts together, the second part carrying a nontilting wheel axle and the superstructure and the first part the tilting wheel axle and the coupling between the chassis parts also is the means linking the tilting wheel axle and the superstructure.

12. A vehicle according to claim 1 having a chassis in first, second and third chassis parts, and couplings coupling the parts together, the first chassis part carrying the tilting wheel axle, the second chassis part carrying a nontilting wheel axle, and the third chassis part carrying a nontilting wheel axle and the superstructure, and the couplings between the chassis parts are also the means linking the tilting wheel axle and the superstructure.

* * * * *